United States Patent
Mikami et al.

(10) Patent No.: US 6,960,421 B2
(45) Date of Patent: Nov. 1, 2005

(54) OPTICAL RECORDING MEDIUM AND FABRICATING METHOD THEREOF

(75) Inventors: Tatsuo Mikami, Kanagawa-ken (JP); Tohru Yashiro, Kanagawa-ken (JP); Tomomi Ishimi, Kanagawa-ken (JP); Takuo Ohishi, Kanagawa-ken (JP)

(73) Assignee: Ricoh Company, Ltd., Tokyo (JP)

( * ) Notice: Subject to any disclaimer, the term of this patent is extended or adjusted under 35 U.S.C. 154(b) by 111 days.

(21) Appl. No.: 10/384,295

(22) Filed: Mar. 6, 2003

(65) Prior Publication Data

US 2003/0215673 A1 Nov. 20, 2003

(30) Foreign Application Priority Data

Mar. 8, 2002 (JP) ........................................ 2002-064530

(51) Int. Cl.⁷ ................................................ G11B 7/26
(52) U.S. Cl. .................. 430/280.15; 430/945; 428/64.8
(58) Field of Search ............................ 430/290.15, 945; 430/720.15; 428/64.8

(56) References Cited

U.S. PATENT DOCUMENTS

| 5,169,745 | A | 12/1992 | Yashiro et al. |
| 5,238,722 | A | 8/1993 | Yashiro et al. |
| 5,242,730 | A | 9/1993 | Yashiro et al. |
| 5,252,372 | A | 10/1993 | Yashiro et al. |
| 5,316,814 | A | 5/1994 | Sawada et al. |
| 5,532,033 | A | 7/1996 | Yashiro |
| 5,536,548 | A | 7/1996 | Koji et al. |
| 5,580,696 | A | 12/1996 | Yashiro |
| 5,789,138 | A | 8/1998 | Yashiro |
| 5,882,757 | A | 3/1999 | Yashiro |
| 5,932,721 | A | 8/1999 | Yashiro et al. |
| 5,968,708 | A | 10/1999 | Yashiro et al. |
| 6,043,355 | A | 3/2000 | Yashiro et al. |
| 6,045,971 | A | 4/2000 | Yashiro |
| 6,137,769 | A | 10/2000 | Sawada et al. |
| 6,469,963 | B1 | 10/2002 | Sawada et al. |
| 6,649,240 | B2 | 11/2003 | Ohishi |
| 6,794,005 | B2 * | 9/2004 | Noguchi et al. ........... 428/64.1 |
| 2002/0090485 | A1 | 7/2002 | Ohishi |
| 2003/0059712 | A1 | 3/2003 | Yashiro |
| 2003/0063539 | A1 | 4/2003 | Yashiro |

FOREIGN PATENT DOCUMENTS

| EP | 0 849 726 A1 | 6/1998 |
| EP | 0 896 327 A1 | 2/1999 |
| JP | 01-29793 | * 11/1989 |
| JP | 03-153387 | 7/1991 |
| JP | 03-153388 | 7/1991 |
| JP | 08-282103 | * 10/1996 |

OTHER PUBLICATIONS

European Patent Office, search report dated Sep. 28, 2003 in European Patent Application No. 03005057.9–2210–.

* cited by examiner

*Primary Examiner*—Martin Angebranndt
(74) *Attorney, Agent, or Firm*—Cooper & Dunham LLP

(57) ABSTRACT

An optical recording medium is described, having suitable recording characteristics over a wide range of recording linear speed and fitting with recording/reproduction apparatuses of CD-R specifications. The optical recording medium includes a substrate having at least a light absorbing layer thereon, which is mainly composed of three phthalocyanine compounds (I), (II) and (III). Each of the phthalocyanine compounds (I) and (II) has a thermal decomposition temperature of from 200° C. to 300° C., and has a different light absorption ability against light having a wavelength of 780 nm. The phthalocyanine compound (III) has a thermal decomposition temperature of from 300° C. to 350° C.

10 Claims, No Drawings

OPTICAL RECORDING MEDIUM AND FABRICATING METHOD THEREOF

BACKGROUND

1. Field

The present patent specification relates to an optical recording medium having improved optical properties, and a method for fabricating the same.

2. Description of the Related Art

Recently, write-once compact disks (CD) are widely available in the market. A write-once CD differs from conventional CDs in that the user can record information on it, and the signals recorded on the write-once CD also satisfy the specifications of conventional CDs and therefore can be reproduced using a commercially available CD player. One method for fabricating such a recording medium is described in Japanese Patent Application Laid Open No. Hei 2-42652, which include forming a light absorbing layer by spin-coating a substrate with a dye and then forming a metallic reflecting layer on the back side of the substrate. Moreover, Japanese Patent Application Laid Open No. Hei 2-132656 discloses a currently commercialized write-once CD, in which the complex refractive index and the thickness of the light absorbing layer are suitably adjusted to make the recorded signals satisfy the CD specifications. However, the dye-containing write-once CDs disclosed in Japanese Patent Application Laid Open No. Hei 2-42652 and No. Hei 2-132656 both do not have sufficient light resistance. That is, the signal characteristics of the CDs will change after exposure to sunlight for a long time or the like, and therefore will not satisfy the CD specifications thereafter. The drawback is caused by light-induced deterioration of the dyes, especially the cyanine dyes, used in the light absorbing layer.

A method for inhibiting the light-induced deterioration of dyes is to add a light stabilizing agent in the light absorbing layer, as described in Japanese Patent Application Laid Open No. Sho 63-159090. However, as the addition amount of the light stabilizing agent is small (<20%), the light resistance is insufficient. The addition of large amount of light stabilizing agent (>20%) will alter the optical and/or the thermal properties of the light absorbing layer, and the quality of signals is lowered in every aspect. On the other hand, Japanese Patent Application Laid Open No. Hei 3-62878 discloses a write-once CD that uses phthalocyanine compounds, which are dyes having a high degree of light resistance. In such a write-once CD, the required complex refractive index of the light absorbing layer, which is formed by spin-coating a substrate with phthalocyanine compounds, is obtained by incorporating specific functional groups to the phthalocyanine compounds. Thereby, a write-once CD having high light resistance can be fabricated. However, as compared with the conventional write-once CDs that use cyanine dyes in the light absorbing layer, the one disclosed in Japanese Patent Application Laid Open No. Hei 3-62878 is of inferior quality in the aspect of reproduced signals. That is, the length (pit length) of each signal in the reproduced signals tends to differ from the theoretical pit length of the original CD signal, and therefore reproduction errors easily occur.

One method for solving the aforementioned problem is described in Japanese Patent Application Laid Open No. Hei 11-48613, which is a prior application of the Inventors. In the method, phthalocyanine compounds that have thermal decomposition temperatures ranging from 350° C. to 450° C., are mixed in specific ratios, so as to inhibit the variation of pit lengths. However, as the recording linear speed continuously gets higher, the noise jitter of the write-once CD disclosed in Japanese Patent Application Laid Open No. Hei 11-48613 is significantly increased, and the characteristics of the write-once CD are deteriorated. Moreover, Japanese Patent Application Laid Open No. Hei 10-181204, which is also a prior application of the Inventors, discloses an optical recording medium that includes a light absorbing layer mainly composed of two phthalocyanine compounds having a thermal decomposition temperature from 250° C. to 350° C. and a thermal decomposition temperature from 350° C. to 450° C., respectively. The optical recording medium has better signal characteristics and higher light resistance and causes less reproduction errors, but does not have suitable recording characteristics over a wide range of recording linear speed.

SUMMARY

To solve the aforementioned problems, this invention provides an optical recording medium that has suitable recording characteristics over a wide range of linear speed and fits with recording/reproducing apparatuses of CD-R specifications. This invention also provides a method that can be used to fabricate the optical recording medium with ease, higher reproducibility and at lower cost.

After studying the issues with efforts, the Inventors found that the problems can be solved by combining three tetraazaporphyrin compounds (I), (II) and (III) described later.

The optical recording medium comprises a substrate that has a light absorbing layer thereon, which includes three tetraazaporphyrin compounds (I), (II) and (III). The tetraazaporphyrin compounds (I), (II) and (III) are selected from the group consisting of phthalocyanine, naphthalocyanine, tetraazaporphyrin compounds and derivatives thereof. Each of the tetraazaporphyrin compounds (I) and (II) has a thermal decomposition temperature of from 200° C. to 300° C., and has a different light absorption ability with respect to recording/reproducing light having a wavelength of 780 nm. The tetraazaporphyrin compound (III) has a thermal decomposition temperature of from 300° C. to 350° C. The thermal decomposition temperatures are measured with a thermobalance under a heating rate of 10° C./min.

In the optical recording medium of this invention, the molar ratios x, y and z of the phthalocyanine compounds (I), (II) and (III), i.e., the ratios of the molar numbers of the compounds to the total molar number in the light absorbing layer, preferably satisfy the following relationships: $0.3 \leq x \leq 0.7$, $0.15 \leq y \leq 0.35$, $0.15 \leq z \leq 0.35$, and $x+y+z<1$.

Moreover, in the optical recording medium of this invention, the phthalocyanine compounds (I), (II) and (III) are preferably selected from the three groups of compounds represented by general formulae (1), (2) and (3), respectively:

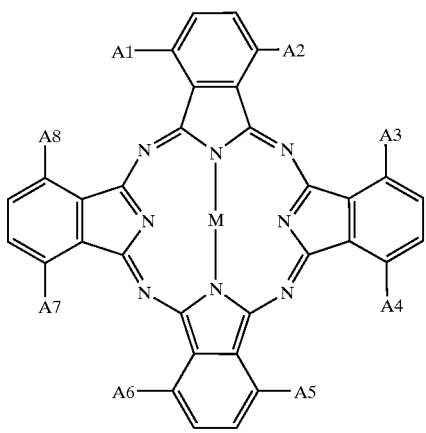

(1)

wherein M represents VO, and one of each pair of functional groups (A1 and A2, A3 and A4, A5 and A6, or A7 and A8) is a group represented by —O—$CR^1R^2R^3$ and the other is a hydrogen atom, wherein $R^1$ represents a straight or branched fluorine-substituted alkyl group having from 1 to 10 carbon atoms, $R^2$ represents a hydrogen atom, or a straight or branched, unsubstituted or fluorine-substituted alkyl group having from 1 to 10 carbon atoms, and $R^3$ represents a phenyl group that is unsubstituted or is substituted with a straight or branched alkyl group having from 1 to 10 carbon atoms;

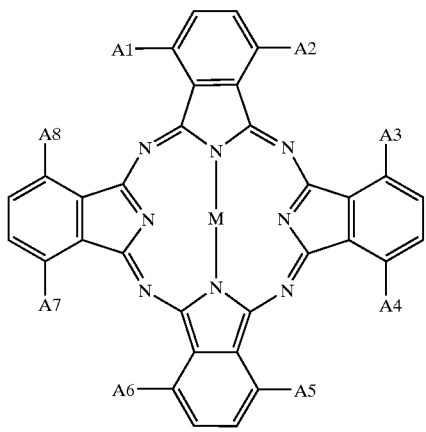

(2)

wherein M represents Zn, and one of each pair of functional groups (A1 and A2, A3 and A4, A5 and A6, or A7 and A8) is a group represented by —O—$CR^1R^2R^3$ and the other is a hydrogen atom, wherein $R^1$ represents a straight or branched fluorine-substituted alkyl group having from 1 to 10 carbon atoms, $R^2$ represents a hydrogen atom, or a straight or branched, unsubstituted or fluorine-substituted alkyl group having from 1 to 10 carbon atoms, and $R^3$ represents a phenyl group that is unsubstituted or is substituted with a straight or branched alkyl group having from 1 to 10 carbon atoms; and

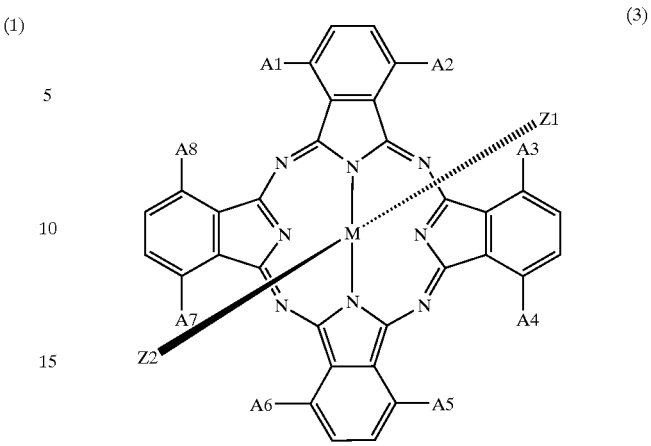

(3)

wherein M represents Si, one of each pair of functional groups (A1, A2), (A3, A4), (A5, A6) or (A7, A8) is a heterocyclic ring having two or more nitrogen atoms as ring hetero-atoms, wherein each carbon atom not forming a bond with the phthalocyanine ring forms a bond with a hydrogen atom, a halogen atom, or a straight or branched alkyl group having from 1 to 10 carbon atoms; and each of Z1 and Z2 represents a halogen atom, a hydroxyl group, —O—R, —O—CO—R or —O—SOO—R, wherein R represents a straight or branched alkyl group having from 1 to 10 carbon atoms, an aryl group, a heterocyclic aromatic group or a metal complex group.

Moreover, in the optical recording medium of this invention, the light absorbing layer may further comprise an amino-compound capable of coordinating with the central metal of the phthalocyanine compound (I), (II) or (III). The amino-compound may comprise a compound that has a heterocyclic ring containing at least one nitrogen atom as a ring hetero-atom. Such compounds may be selected from the group consisting of imidazole, benzimidazole, thiazole compounds and derivatives thereof.

Furthermore, in the optical recording medium of this invention, the light absorbing layer preferably has an absorption peak wavelength ($\lambda_{max}$) of from 710 nm to 750 nm.

The method for fabricating an optical recording medium of this invention is described below. A substrate with at least one of information pits and guide grooves formed thereon is provided. A light absorbing layer comprising the phthalocyanine compounds (I), (II) and (III) mentioned above is formed, directly or via an intermediate layer, on the substrate. A light reflecting layer is then formed, directly or via an intermediate layer, on the light absorbing layer, and a protective layer is formed on the light reflecting layer.

It is to be understood that both the foregoing general description and the following detailed description are exemplary, and are intended to provide further explanation of the invention as claimed.

DESCRIPTION OF PREFERRED EMBODIMENTS

The present invention will be described below in detail. The present invention features with the light absorbing layer comprising three phthalocyanine compounds (I), (II) and (III), which are abbreviated to compounds (I), (II) and (III), respectively. The compound (I) has a thermal decomposition temperature of from 200° C. to 300° C., which is relatively lower among phthalocyanine compounds. Therefore, recording pits are easily formed with thermal decomposition, and the recording sensitivity and the noise jitter property of the medium are therefore better. Nevertheless, the recording pits are easily expanded due to heat, and the aforementioned problem could occur, i.e., the pit length becomes larger than the desired length (theoretical length). Moreover, the light absorption band wavelength of the absorption layer is in a long wavelength range, so the absorption layer is overly absorptive to the wavelength of 780 nm, of the recording/reproducing laser diode (LD). Therefore, it is difficult to meet the requirement of high reflectivity.

The compound (II) has the same substituents and the same thermal decomposition characteristics as that of the compound (I), but the light absorption band wavelength of the absorption layer is in a short wavelength range. Therefore, the absorption layer is less absorptive to the wavelength of 780 nm, of the recording/reproducing LD, and a high reflectivity can be obtained. However, the recording sensitivity is adversely lowered in this case. On the other hand, the compound (III) has a thermal decomposition temperature (300–350° C.) higher than that of the compound (I) or (II), so the recording sensitivity thereof is lower as compared with the compound (I). However, the variation of the pit length can be reduced in this case. It should be noted that the thermal decomposition temperature here means a thermogravimetric change temperature, which is defined as the temperature at the TG inflection point or the temperature when the weight of a powder sample of the compound changes by 5% as thermally analyzed using a thermobalance with a heating rate of 10° C./min.

Since this invention forms a layer having a mixture of the compounds (I), (II) and (IIII) as the light absorbing layer, the effects of each compound can be obtained simultaneously. That is, a balance can be achieved between the aforementioned thermal and optical properties, including noise jitter, pit length variation and reflectivity. Moreover, the molar ratios x, y and z of the phthalocyanine compounds (I), (II) and (III), i.e., the ratios of the molar numbers of the compounds to the total molar number in the light absorbing layer, preferably satisfy the following relationship: $0.3 \leq x \leq 0.7$, $0.15 \leq y \leq 0.35$, $0.15 \leq z \leq 0.35$, and $x+y+z<1$. The balance between all the properties can be easily achieved with such ratios.

The representative example of the compound (I) is the phthalocyanine compound expressed by the general formula (1). Since the phthalocyanine compound has a benzyloxy group (phenylmethyloxy group) expressed by —O—CR$^1$R$^2$R$^3$, it has a characteristic thermal decomposition temperature of from 200° C. to 300° C. Moreover, the thermal decomposition temperature and the light absorption band wavelength can be adjusted by varying R$^1$, which represents a straight or branched fluorine-substituted alkyl group having from 1 to 10 carbon atoms. That is, the thermal decomposition temperature can be lowered by increasing the number of carbon atoms of the alkyl group. Furthermore, by increasing the number of fluorine atoms, the light absorption band wavelength can be shifted to a shorter wavelength. However, in the cases where the light absorption band wavelength cannot be shifted to a shorter one with fluorine substitution, the light absorption band is in a long wavelength range. Therefore, the light absorption of the film is large at the LD wavelength of 780 nm, so that the film is not suitable in medium with high reflectivity, such as CD-R. Specific examples of R$^1$ include —CF$_3$, —C$_2$F$_5$, —CF(CF$_3$)$_2$, —C$_4$F$_9$, wherein those having lesser carbon atoms or shorter carbon chain, such as —CF$_3$ and —C$_2$F$_5$, are more preferable.

R$^2$ represents a hydrogen atom, or a straight or branched, unsubstituted or fluorine-substituted alkyl group having from 1 to 10 carbon atoms. Specific examples of the fluorine-substituted alkyl group include those mentioned in the case of R$^1$. Specific examples of the unsubstituted alkyl group include methyl, ethyl, n-propyl, isopropyl, n-butyl, sec-butyl and t-butyl. R$^3$ is a phenyl group that is unsubstituted or is substituted with a straight or branched alkyl group having from 1 to 10 carbon atoms. Specific examples of R$^3$ include the following functional groups:

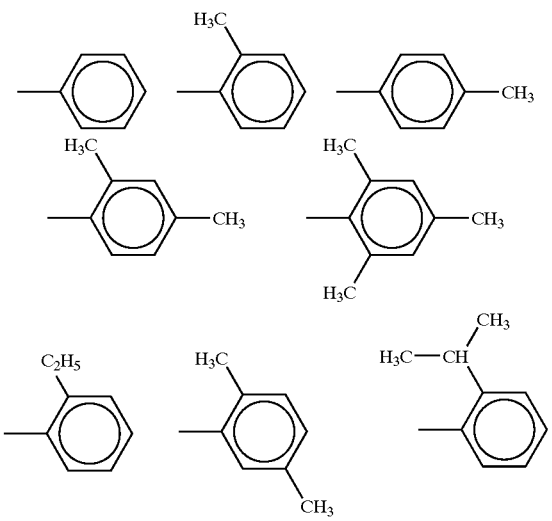

The central metal is preferably VO, so that the durability (light resistance and heat resistance) can be improved, and the light absorption band wavelength can be shifted to a longer wavelength.

Moreover, in the synthesis of the compound of formula (1), it is not easy to introduce a benzyloxy group as a specific functional in each pair of functional groups (A1 and A2, A3 and A4, A5 and A6, or A7 and A8). That is, it is difficult to specifically synthesize a pure isomer of formula (1), and usually a mixture of plural isomers is obtained with a benzyloxy group being introduced as any one in each pair of functional groups (A1 and A2, A3 and A4, A5 and A6, or A7 and A8). Moreover, it is not feasible to introduce two benzyloxy groups as a pair of functional groups (A1 and A2, A3 and A4, A5 and A6, or A7 and A8) in consideration of steric hinderence. Advantageously, the thermal decomposition characteristics of such a mixture of isomers are excellent within the specific temperature range disclosed in this invention, and specific synthesis of a pure isomer is not necessary. Moreover, the compound of formula (2) or (3) described later is also a mixture of isomers with a substituent being introduced as any one in each pair of functional groups (A1 and A2, A3 and A4, A5 and A6, or A7 and A8). That is, the compound (1), (2) or (3) used in the Examples and the Comparative Examples described later is a mixture of isomers with a substituent shown in the columns of "A1–A8" in Table 1 being introduced as any one in each pair of functional groups (A1 and A2, A3 and A4, A5 and A6, or A7 and A8). For example, the compounds (2) used in Example 1 and Comparative Examples 2/3 have the same substituent, but have different thermal decomposition temperatures (252° C. vs. 228° C.) because they are mixtures of different compositions. The composition ratios of isomers in such a mixture are dependent on the conditions of the cyclization reaction, i.e., the species of the solvent, the reaction temperature and the reaction time, etc., and therefore can be adjustd to the required ones by varying the reaction conditions. Moreover, since the spreadabilities of the isomers to the solvent are different, the composition ratios of the isomers can be adjusted using a separating method such as chromatography after the synthesis. Since the stability of an isomer and the substituents thereon changes with the degree of the symmetry of the molecular structure and the steric hinderances of the substituents, the thermal decomposition temperature varies with the structure of the isomer.

The representative example of the compound (II) is the phthalocyanine compound expressed by the general formula (2). The basic structure and the species and functions of the substituents of the phthalocyanine compound are the same as those of the phthalocyanine compound of formula (1), but the central metal M thereof is preferably zinc (Zn). Such a modification makes the light absorption band wavelength shorter by about 30 nm as compared with the phthalocyanine compound (I) of formula (1), so the compound (II) has a low absorptivity to the recording/reproducing wavelength of 780 nm. That is, the light absorption ability of the compound (II) to the wavelength of 780 nm is different from that of the compound (I). On the other hand, the representative example of the compound (III) is the phthalocyanine compound expressed by the general formula (3). Since the compound has a heterocyclic ring containing two or more nitrogen atoms as ring hetero-atoms, the compound is characterized with a thermal decomposition temperature of from 300° C. to 350° C. Specific examples of the heterocyclic ring include the following functional groups:

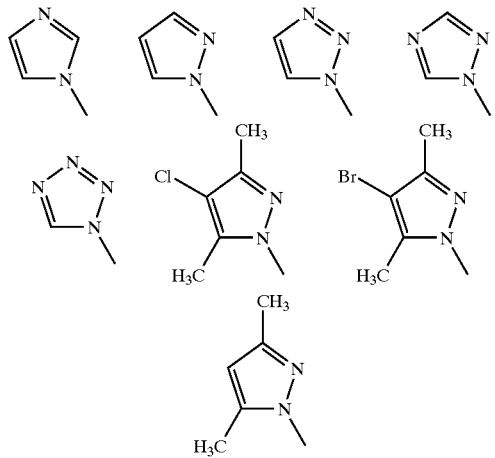

Moreover, the central metal of the compound (III) is preferably silicon (Si). The functional groups Z1 and Z2 can be different or the same, and is usually the same as in Table 1 and in the Examples and the Comparative Examples described later.

The light absorbing layer composed of the aforementioned compounds (I)–(III) can be easily formed by dissolving the three compounds with a suitable solvent and coating a substrate with the solution. Moreover, an amino-compound is preferably added into the solution containing the three compounds. The amino-compound is one that could easily coordinate with the central metals of the phthalocyanine compounds, so that the solubility of the phthalocyanine compounds in the solvent and the film coating property of the same can be improved. The effect is particularly remarkable for the phthalocyanine compound of formula (2) that contains Zn as a central metal.

Specific examples of the amino-compound include n-butylamine, n-hexylamine, t-butylamine, pyrrole, pyrrolidine, pyridine, piperidine, purine, imidazole, benzimidazole, 5,6-dimethylbenzimidazole, 2,5,6-trimethylbenzimidazole, naphtho-imidazole, 2-methylnaphthoimidazole, quinoline, isoquinoline, quinoxaline, benzquinoline, phenanthridine, indoline, carbazole, norharman, thiazole, benzthiazole, benzoxazole, benztriazole, 7-azaindole, tetrahydroquinoline, triphenylimidazole, phthalimide, benzoisoquinoline-5,10-dione, triazine, perimyzine, 5-chlorotriazole, ethylenediamine, azobenzene, trimethylamine, N,N-dimethylformiamide, 1-(2H)-phthalazinone, phthalhydrazide, 1,3-diiminoisoindoline, oxazole, polyimidazole. polybenzimidazole and polythiazole, etc., however, the amino-compounds are not limited to above compounds.

Among the aforementioned amino-compounds, those having nitrogen atoms in a heterocyclic ring are more preferable for preventing aggregation of the phthalocyanine compounds and for improving the durability, i.e., for improving the heat resistance and the light resistance. Moreover, the melting point of the amino-compound is preferably higher than 150° C. for maintaining the thermal stability of the light absorbing layer. As the melting point is lower than 150° C., the properties, especially the optical properties, of the light absorbing layer are easily changed under high-temperature and high-humidity conditions. The compounds that meet the above-mentioned requirements are imidazole derivatives, benzimidazole derivatives and thiazole derivatives.

Moreover, dyes used as recording materials in conventional information recording materials can also be added as light absorbing materials to the above-mentioned phthalocyanine compounds (I), (II) and (III). Examples of such dyes are cyanine dyes, pyrylium-thiopyrylium dyes, azulenium dyes, squalilium dyes, metal complex dyes such as Ni, Cr complex dyes, naphthoquinone-anthraquinone dyes, indophenol dyes, indoaniline dyes, triphenylmethane dyes, triarylmethane dyes, aminium-diimmonium dyes and nitroso compounds. Furthermore, a third component such as a binder or a stabilizer can also be added. On the other hand, in order to fit the recording/reproducing apparatuses of CD-R specifications, the light absorbing layer preferably has a light absorption peak at a wavelength ($\lambda_{max}$) ranging from 710 nm to 750 nm through a suitable combination of the phthalocyanine compounds (I), (II) and (III). Moreover, the thickness of the light absorbing layer preferably ranges from 100 Å to 5000 Å, more preferably from 500 Å to 3000 Å. As the thickness is smaller than 100 Å, the recording sensitivity is low; as the thickness is larger than 5000 Å, the reflectivity is insufficient.

The substrate employed in this invention can be any type of substrate that has been employed in conventional information recording medium. Examples of the materials for the substrate include acrylic resins such as polymethyl methacrylate; vinyl chloride resins such as polyvinyl chloride and vinyl chloride copolymer; epoxy resin; polycarbonate resin; amorphous polyolefin; polyester; glass such as soda-lime glass; and ceramics. In particular, in view of dimensional stability, transparency and flatness, polymethyl methacrylate, polycarbonate resin, epoxy resin, amorphous polyolefin, polyester and glass are preferable.

In order to improve the flatness and adhesiveness of the surface of the substrate on the side of the light absorbing layer and to prevent the deterioration of the light absorbing layer, an undercoat layer may be further provided between the light absorption layer and the substrate. Examples of the materials for the undercoat layer include polymers include, for example, polymethyl methacrylate, acrylic acid/ methacrylic acid copolymer, styrene/maleic anhydride copolymer, polyvinyl alcohol, N-methylol acrylamide, styrene/sulfonic acid copolymer, styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene and polycarbonate; organic materials such as silane coupling agents; and inorganic materials, including inorganic oxides such as $SiO_2$ and $Al_2O_3$, and inorganic fluoride compounds such as $MgF_2$. It is preferable that the undercoat layer has a thickness in the range of 0.005 µm to 20 µm, more preferably in the range of 0.01 µm to 10 µm.

Moreover, a pregroove layer can be provided on the surface of the substrate or the undercoat layer in a form of concave or convex grooves for tracking or for showing address signals. The material for the pregroove layer can be a mixture of at least one monomer or oligomer selected from the group consisting of monoacrylate, diacrylate, triacrylate and tetraacrylate, and a photo-polymerization initiator.

Furthermore, a reflecting layer may be formed on the light absorbing layer for improving the S/N ratio, the reflectivity and the recording sensitivity of the optical information recording medium. The material of the reflecting layer can be a light reflecting material that has a high reflectivity to laser beams. Specific examples of such light reflecting materials include metal elements and semi-metal elements such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ca, In, Si, Ge, Te, Pb, Po, Sn and Si. Among the above-mentioned light reflection materials, Au, Al and Ag are particularly preferable. The above-mentioned materials can be used alone, in combination or in the form of alloys. Moreover, the thickness of the light reflecting layer preferably ranges from 100 Å to 3000 Å. Besides, the light reflecting layer may be interposed between the substrate and the light absorbing layer. In this case, recording and reproduction of information are conducted on the side of the light absorbing layer, which is disposed opposite to the substrate with respect to the light reflecting layer.

Furthermore, a protective layer may be provided on the light absorbing layer or the reflecting layer in order to protect the light absorbing layer or the reflecting layer physically or chemically. Such a protective layer may also be provided on the side of the substrate on which the light absorbing layer is not provided in order to improve the scratch resistance and humidity resistance. The materials of the protective layer include, for example, inorganic materials such as SiO, $SiO_2$, $MgF_2$ and $SnO_2$, thermoplastic resin, thermosetting resin, and UV curing resin. Moreover, it is preferable that the protective layer has a thickness in the range of 500 Å to 50 µm.

A method for fabricating the optical information recording medium of the present invention will be explained. The method preferably comprises the steps of:

(a) providing a light absorbing layer, directly or via an intermediate layer, on a substrate with information pits and/or guide grooves being formed on the surface thereof by using a film coating method, the light absorbing layer comprising three phthalocyanine compounds selected from the compounds (I), (II) and (III), respectively;

(b) providing the light reflecting layer, directly or via an intermediate layer, on the light absorbing layer by using vacuum filming; and (c) providing a protective layer on the light reflecting layer.

Each step will be described below in sequence.

[Formation of Light Absorbing Layer]

A light absorbing layer mainly composed of the compounds (I), (II) and (III) is formed, directly or via an intermediate layer, on a substrate with information pits and/or guide grooves being formed on the surface thereof by using a coating filming method. More specifically, the compounds (I), (II) and (III) are dissolved in a solvent, and the coating liquid such prepared is coated on the substrate. The solvent for preparing the coating liquid can be any organic solvent known in the prior art, such as alcohol, cellosolve, halogenated hydrocarbon, ketone and ether. Among the coating methods that can be used, the spin coating method is preferable because the thickness of the light absorbing layer can be easily controlled by adjusting the concentration and viscosity of the coating liquid and the drying temperature of the coated film. An undercoat layer mentioned above is provided on the side of the substrate on which the light absorbing layer is formed in order to improve the flatness and adhesion of the substrate, and also to prevent the deterioration of the light absorbing layer. The undercoat layer can be formed by dissolving a previously mentioned material for the undercoat layer in an appropriate solvent and coating the liquid on the surface of the substrate by using a method such as spin coating, dip coating or extrusion coating.

[Formation of Light Reflecting Layer]

Thereafter, the light reflecting layer is provided, directly or via an intermediate layer, on the light absorbing layer by using vacuum filming. More specifically, one of the previously mentioned materials for the light reflecting layer is deposited on the light absorbing layer with, for instance, evaporation, sputtering or ion plating.

[Formation of Protective Layer]

Thereafter, a protective layer is provided on the light reflecting layer. More specifically, one of the previously mentioned materials for the protective layer is deposited on the light reflection layer using, for instance, vacuum filming or coating filming. Among the material that can be used for the protective layer, UV curing resin is more preferable. A protective layer composed of UV curing resin is formed by, for instance, coating a layer of UV curing resin on the light reflecting layer using a spin coating method and curing the coated film with UV irradiation.

This invention will be explained specifically with the following examples, but is not restricted by them. Moreover, Table 1 and Table 2 are shown after the descriptions of the examples.

EXAMPLE 1

A substrate, which is constituted of a round polycarbonate plate having a diameter of 120 mm and a thickness of 1.2 mm, is provided with concave and convex patterns of guide grooves having a depth of about 1500 Å formed on the surface thereof. Then, the phthalocyanine compounds (1), (2) and (3) as shown in the row of Example 1 in Table 1 and an amino-compound, 5,6-dimethylbenzimidazole, are dissolved in a mixed solvent composed of tetrahydrofuran, 1-methoxybutanol, ethylcyclohexane and 2-propanol. The above coating liquid is then used to form a light absorbing layer having a thickness of about 1500 Å using a spin coating method. The molar ratios of the compounds (1), (2) and (3) and 5,6-dimethylbenzimidazole are 0.4, 0.2, 0.2 and 0.2, respectively. Moreover, the thermal decomposition temperatures of the compounds (1), (2) and (3) are 290° C., 252° C. and 327° C., respectively, measured with a thermo-analyzer TG/DTA220 manufactured by Seiko Instruments Corp. In addition, the wavelengths of maximum absorption peak ($\lambda_{max}$) of the compounds (1), (2) and (3) in $CHCl_3$/film are 720 nm/732 nm, 695 nm/704 nm and 710 nm/726 nm, respectively, measured with a spectrophotometer UV-3100 manufactured by Shimadzu Seisakusho Ltd. Thereafter, a light reflecting layer of Ag with a thickness of about 1200 Å is formed on the light absorbing layer using a sputtering method. A protective layer composed of a UV curing resin with a thickness of about 5 μm was provided on the above light reflecting layer, whereby an optical information recording medium of the present invention was fabricated. Subsequently, EFM signals are recorded on the optical recording medium with a recording/reproduction evaluation apparatus DDU-100 manufactured by PULSTEC INDUSTRIAL Co., Ltd., and the recorded EFM signals are reproduced therefrom with the same apparatus. The recording operation uses a laser beam with a wavelength of 785 nm under the conditions that the numerical aperture (NA) is 0.5, the linear speed is 1.2 m/sec and β=4%, and the signal reproduction is conducted with a power of 0.5 mW. Errors of the reproduced signals are detected by using an EMF decoder DR-3552 manufactured by Kenwood Corp., and the result (<220) satisfies the CD-R standards (Orange Book). The pit lengths of the reproduced signals were measured by a time interval analyzer 53310A manufactured by Hewlett Packard Company, and it is found that the deviation of the pit lengths is 40 ns or less, which also satisfies the CD-R standards (Orange Book). Thereafter, the same recording operation is conducted with a linear speed of 48 m/s, and the pit lengths of the reproduced signals are measured with the same time interval analyzer. It is found that the results also satisfy the CD-R standards (Orange Book), as shown in Table 2.

EXAMPLES 2–3

In Example 2 or 3, an optical recording medium is fabricated and evaluated as in Example 1 except that the phthalocyanine compound (3) is replaced with the one shown in the row of Example 2 or 3 in Table 1. The results indicate that the deviation of the pit lengths is 40 ns or less as the linear speed is 1.2 m/s or 48 m/s, and the value of C1 error is less than 220.

COMPARATIVE EXAMPLE 1

In this Example, an optical recording medium is fabricated and evaluated as in Example 1 except that the phthalocyanine compound (2) used has a thermal decomposition temperature of 390° C., as shown in the row of Comparative Example 1 in Table 1. The results indicate that the properties of the optical recording medium do not meet the requirements as the linear speed is 48 m/s, as shown in Table 2.

COMPARATIVE EXAMPLES 2–3

In Comparative Example 2 or 3, an optical recording medium is fabricated and evaluated as in Example 1 except that the phthalocyanine compound (2) used has a thermal decomposition temperature of 228° C. and the molar ratios of the compounds (1), (2) and (3) and the amino-compound are changed. Moreover, the mixing ratio of the amino-compound is the same as that of the compound (2), being 0.8/0.21 in Comparative Example 2/3. The results indicate that the properties of the optical recording medium in Comparative Example 2 or 3 do not meet the requirements, as shown in Table 2. In addition, the reflectivity is barely higher than 65%, which is a value required by the specifications of the Orange Book.

TABLE 1

| | Compound(1) | | | | Compound(2) | | |
|---|---|---|---|---|---|---|---|
| | A1–A8 | | $\lambda_{max}$* (nm) | TDT* (° C.) | A1–A8 | | $\lambda_{max}$ (nm) | TDT (° C.) |
| Example 1 | 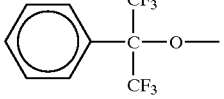 | | 720/732 | 290 | 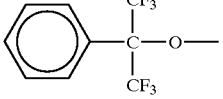 | | 695/704 | 252 |
| Example 2 | 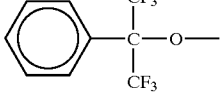 | | 720/732 | 290 | 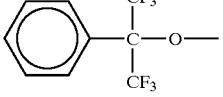 | | 695/704 | 252 |
| Example 3 | 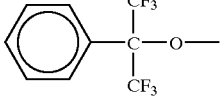 | | 720/732 | 290 | 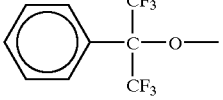 | | 695/704 | 252 |
| Comparative Example 1 | 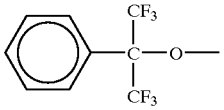 | | 720/732 | 290 | 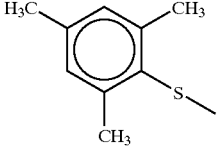 | | 721/732 | 390 |
| Comparative Example 2 | 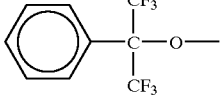 | | 720/732 | 290 | 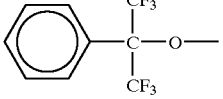 | | 695/704 | 228 |

TABLE 1-continued
| | | | | | | | |
|---|---|---|---|---|---|---|---|
| Comparative Example 3 | 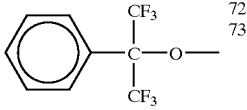 | 720/ 732 | 290 | 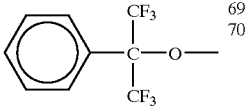 | 695/ 704 | 228 | |
| | Compound(3) | | | | |
|---|---|---|---|---|---|
| | A1–A8 | Z1,Z2 | $\lambda_{max}$ (nm) | TDT (° C.) | Molar ratio [(1)/(2)/(3)] |
| Example 1 | 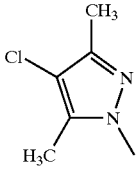 | 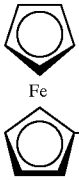 | 710/ 726 | 327 | [0.4/0.2/0.2] |
| Example 2 | 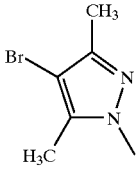 |  | 705/ 724 | 320 | [0.4/0.2/0.2] |
| Example 3 | 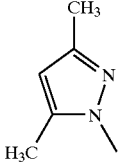 | 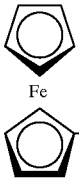 | 706/ 726 | 344 | [0.4/0.2/0.2] |
| Comparative Example 1 | 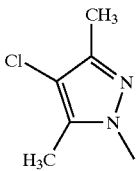 |  | 710/ 726 | 327 | [0.4/0.2/0.2] |
| Comparative Example 2 | 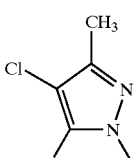 |  | 710/ 726 | 327 | [0.6/0.8/0.2] |
| Comparative Example 3 | 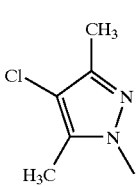 |  | 710/ 726 | 327 | [0.63/0.21/0.8] |
*TDT: Thermal Decomposition Temperature;
*$\lambda_{max}$: in $CHCl_3$/film

TABLE 2

| | 1.2 m/s | | | 48 m/s | | |
|---|---|---|---|---|---|---|
| | C1 Error | Pit length variation | Reflectivity | C1 Error | Pit length variation | Reflectivity |
| Example 1 | O (≦220) | ≧−40 ns ≦40 ns | 73% | O (≦220) | ≧−40 ns ≦40 ns | 71% |
| Example 2 | O (≦220) | ≧−40 ns ≦40 ns | 73% | O (≦220) | ≧−40 ns ≦40 ns | 71% |
| Example 3 | O (≦220) | ≧−40 ns ≦40 ns | 73% | O (≦220) | ≧−40 ns ≦40 ns | 71% |
| Comparative Example 1 | O (≦220) | ≧−40 ns ≦40 ns | 72% | X (>220) | ≦−60 ns ≧60 ns | 70% |
| Comparative Example 2 | O (≦220) | ≧−40 ns ≦40 ns | 68% | X (>220) | ≦−60 ns ≧60 ns | 66% |
| Comparative Example 3 | X (>220) | ≦−60 ns ≧60 ns | 67% | O (≦220) | ≧−40 ns ≦40 ns | 65% |

As mentioned above, this invention provides an optical recording medium that has suitable recording characteristics over a wide range of recording linear speed. Moreover, with the aforementioned relationships of the molar ratios of the compounds (I), (II) and (III) (0.3≦x≦0.7, 0.15≦y≦0.35, 0.15≦z≦0.35, and x+y+z<1), the recording characteristics of the optical recording medium are even better. Furthermore, by adopting the phthalocyanine compounds of formulae (1), (2) and (3), the optical recording medium can have suitable optical properties that fit the recording/reproducing wavelength range of CD-R specifications.

Moreover, with the addition of an amino-compound capable of coordinating with the central metals of the phthalocyanine compound (I), (II) and (III), the solubility of the phthalocyanine compounds (I), (II) and (III) in a solvent or the coating filming properties of the same can be improved. In addition, as the amino-compound is a compound that has a heterocyclic ring containing at least one nitrogen atom, aggregation of the phthalocyanine compounds can be prevented effectively. Furthermore, as the heterocyclic amino-compound is selected from the group consisting of imidazole, benzimidazole, thiazole compounds and derivatives thereof, the thermal stability of the light absorbing layer can be improved.

Moreover, the optical recording medium particularly fits the recording/reproduction apparatuses of CD-R specifications as the light absorbing layer has an absorption peak wavelength ($\lambda_{max}$) of from 710 nm to 750 nm. On the other hand, by using the method for fabricating an optical recording medium of this invention, an optical recording medium having suitable characteristics can be fabricated with ease, higher reproducibility and at lower cost.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

This application claims the priority benefit of Japanese application serial no. 2002-064530, filed on Mar. 8, 2002, the disclosure of which is hereby incorporated by reference herein.

What is claimed is:

1. An optical recording medium, comprising:
   a substrate; and
   a light absorbing layer located overlying the substrate and comprising tetraazaporphyrin compounds (I), (II) and (III), wherein the tetraazaporphyrin compounds (I), (II) and (III) are selected from the group consisting of phthalocyanine, naphthalocyanine, tetraazaporphyrin compounds and derivatives thereof;

each of the tetraazaporphyrin compounds (I) and (II) has a thermal decomposition temperature of from 200° C. to 300° C., and has a different light absorbing ability against light having a wavelength of 780 nm; and the tetraazaporphyrin compound (III) has a thermal decomposition temperature of from 300° C. to less than 350° C.

2. The optical recording medium of claim 1, wherein the light absorbing layer satisfies the following relationships:

$$0.3 \leq x \leq 0.7, \ 0.15 \leq y \leq 0.35, \ 0.15 \leq z \leq 0.35, \ \text{and} \ x+y+z<1,$$

wherein x, y and z represent molar ratios of the tetraazaporphyrin compounds (I), (II) and (III), respectively.

3. The optical recording medium of claim 1, wherein the tetraazaporphyrin compounds (I), (II) and (III) have the following formulae (1), (2) and (3), respectively:

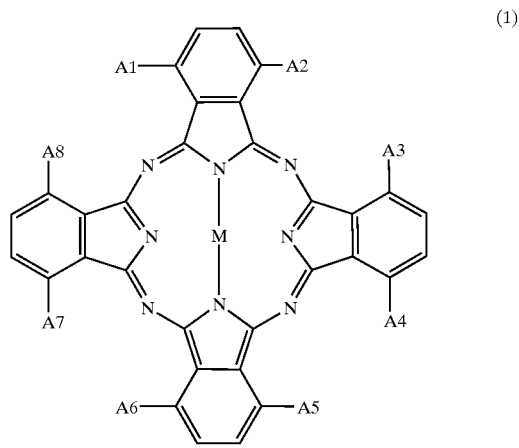

(1)

wherein M represents VO, and one of each pair of functional groups (A1 and A2, A3 and A4, A5 and A6, or A7 and A8) is a group represented by —O—CR$^1$R$^2$R$^3$ and the other is a hydrogen atom, wherein R$^1$ represents a straight or branched fluorine-substituted alkyl group having from 1 to 10 carbon atoms, R$^2$ represents a hydrogen atom, or a straight or branched, unsubstituted or fluorine-substituted alkyl group having from 1 to 10 carbon atoms, and R$^3$ represents a phenyl group that is unsubstituted or is substituted with a straight or branched alkyl group having from 1 to 10 carbon atoms;

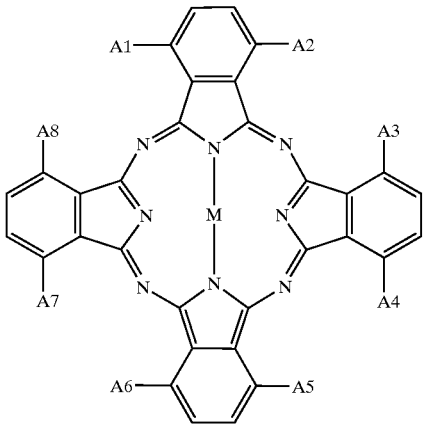

(2)

wherein M represents Zn, and one of each pair of functional groups (A1 and A2, A3 and A4, A5 and A6, or A7 and A8) is a group represented by —O—$CR^1R^2R^3$ and the other is a hydrogen atom, wherein $R^1$ represents a straight or branched fluorine-substituted alkyl group having from 1 to 10 carbon atoms, $R^2$ represents a hydrogen atom, or a straight or branched, unsubstituted or fluorine-substituted alkyl group having from 1 to 10 carbon atoms, and $R^3$ represents a phenyl group that is unsubstituted or is substituted by a straight or branched alkyl group having from 1 to 10 carbon atoms; and

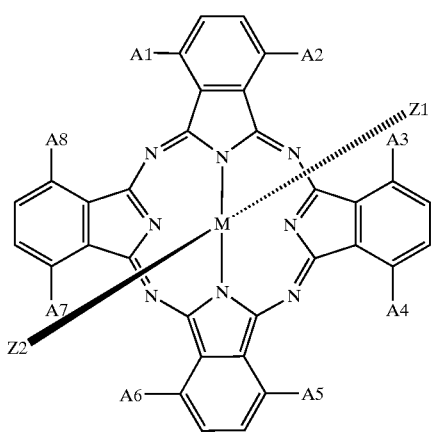

(3)

wherein M represents Si, and one of each pair of functional groups (A1, A2), (A3, A4), (A5, A6) or (A7, A8) is a heterocyclic ring having two or more nitrogen atoms as ring hetero-atoms, wherein each carbon atom not forming a bond with the phthalocyanine ring forms a bond with a hydrogen atom, a halogen atom, or a straight or branched alkyl group having from 1 to 10 carbon atoms; and each of Z1 and Z2 represents a halogen atom, a hydroxyl group, —O—R, —O—CO—R or —O—SOO—R, wherein R represents a straight or branched alkyl group having from 1 to 10 carbon atoms, an aryl group, a heterocyclic aromatic group or a metal complex group.

4. The optical recording medium of claim 1, wherein the light absorbing layer further comprises an amino-compound capable of coordinating with the central metal of the tetraazaporphyrin compounds (I), (II) or (III).

5. The optical recording medium of claim 4, wherein the amino-compound comprises a compound that has a heterocyclic ring containing at least one nitrogen atom as a ring hetero-atom.

6. The optical recording medium of claim 5, wherein the amino-compound having a heterocyclic ring is selected from the group consisting of imidazole, benzimidazole, thiazole compounds and derivatives thereof.

7. The optical recording medium of claim 1, wherein the light absorbing layer has an absorption peak wavelength ($\lambda_{max}$) of from 710 nm to 750 nm.

8. The optical recording medium of claim 1, wherein the substrate has at least one of information pits and guide grooves thereon.

9. The optical recording medium of claim 1, further comprising:
a light reflecting layer located overlying the light absorbing layer; and
a protective layer located overlying the light reflecting layer.

10. A method for fabricating an optical recording medium, comprising:
providing a substrate with at least one of information pits and guide grooves formed thereon;
forming a light absorbing layer comprising tetraazaporphyrin compound (I), (II) and (III) overlying the substrate;
forming a light reflecting layer overlying the light absorbing layer; and
forming a protective layer overlying the light reflecting layer, wherein
the tetraazaporphyrin compounds (I), (II) and (III) are selected from the group consisting of phthalocyanine, naphthalocyanine, tetraazaporphyrin compounds and derivatives thereof;
each of the tetraazaporphyrin compounds (I) and (II) has a thermal decomposition temperature of from 200° C. to 300° C., and has a different light absorbing ability against light having a wavelength of 780 nm; and
the tetraazaporphyrin compound (III) has a thermal decomposition temperature of from 300° C. to less than 350° C.

* * * * *